Patented Nov. 12, 1940

2,221,061

UNITED STATES PATENT OFFICE 2,221,061

PROCESS OF MAKING IRON AND NICKEL ALLOYS

Kenneth M. Simpson, New York, N. Y.

No Drawing. Application February 7, 1939,
Serial No. 255,147

7 Claims. (Cl. 75—131)

This invention relates to a process of making iron nickel alloys directly from ores containing iron and nickel, and more particularly relates to a process of treating such ores with carbon monoxide to produce mixtures of nickel and iron carbonyl which are decomposed to form a metallic alloy of iron and nickel.

The invention is particularly applicable to ores containing relatively large proportions of iron and substantial quantities of nickel. In such ores, the proportions of nickel to iron and various impurities in the ores render the same unsuitable for direct smelting. For example, many ores contain other metals, such as chromium, so that direct smelting produces a mixture of metals which can neither be employed as commercial alloys or as crude iron for making steel.

In accordance with the present invention, I have discovered that an alloy of iron and nickel free from sulfur, phosphorus and other metals and having a low carbon content can be produced by separating the iron and nickel as carbonyl vapors from the ore and simultaneously decomposing the carbonyls to form an alloy. The invention is particularly applicable to the well-known nickel bearing iron ore found in Cuba in which the nickel and iron occur as oxides. This ore contains from approximately 0.5 to 3% nickel and about 50% iron, the remaining being principally oxides of chromium, silicon, aluminum and magnesium.

In carrying out the invention, the ore is subjected to reduction at temperatures substantially below the fusing point of any of the metallic constituents. This reduction is preferably carried out with reducing gases such as water gas or producer gas, preferably the latter, in a closed retort at temperatures which will usually range between 500 and 700° C. The reducing retort is preferably operated at a low superatmospheric pressure in order to exclude air from the retort.

The ore is then withdrawn from the reducing retort and cooled to a temperature between approximately 40° and 80° C. and preferably to a temperature in the lower portion of this range. It is then charged into a second retort or gasifier wherein it is treated with carbon monoxide at temperatures between 40 and 80° C., thereby forming both iron carbonyl, $Fe(CO)_5$, and nickel carbonyl, $Ni(CO)_4$, which are gases at the temperature of treatment. These gases, together with excess carbon monoxide, are withdrawn from the gasifier and delivered to a decomposing chamber in which the gases are heated to a temperature which causes both the nickel and iron carbonyl to decompose and deposit nickel and iron together. The temperature of the decomposition will ordinarily be above 200° C. and usually approximately 240° C. The carbon monoxide liberated during decomposition of the carbonyls is returned to the gasifier for again treating the reduced ore to form carbonyls. The reduced ore from which nickel and iron has been removed in the form of carbonyls may then be discharged from the process or may be again subjected to reduction and treatment with carbon monoxide to remove additional iron and nickel. By closely controlling the treating conditions in the various steps of the process above described, it has been found possible to make iron-nickel alloys having a wide range of proportions of nickel to iron and to hold these proportions substantially constant to produce a desired product. The proportion of each metal depends, in part, upon the temperature at which the ores are reduced, the temperature at which the formation of the carbonyls takes place, the proportions of iron and nickel in the ores originally used and the proportions of iron and nickel reduced to metallic form in the reducing step.

It may be stated, as a general principle in carrying out the process, that relatively high temperatures, within the limits set forth, produce an alloy higher in iron and lower in nickel. Conversely, the use of relatively low temperatures within the range set forth results in an alloy higher in nickel and lower in iron. Thus, in the reducing operation, the higher the temperature employed, the greater is the ratio of iron to nickel reduced to metallic form. The carbon monoxide will react only with the metals in their metallic form and the greater the percentage of iron present in the reduced ore, that is in the gasifier, the greater will be the ratio of iron carbonyl to nickel carbonyl in the gases withdrawn from the gasifier. The treating conditions in the various steps of the process can be varied to vary the ratio of iron to nickel in the final alloy and by controlling said conditions in one or more of the steps iron-nickel alloys having a desired ratio of iron to nickel may be accurately produced.

What I claim is:

1. The process of producing iron-nickel alloys having a desired ratio of nickel and iron from an ore containing iron and nickel in which the iron is present in substantially greater quantities than the nickel, which comprises, reducing at least a portion of the iron and nickel in said ore to metallic form at a temperature between 500 and 700° C., treating the reduced ore with carbon monoxide to form iron and nickel carbonyls in vapor form, and simultaneously decomposing said carbonyls to deposit an iron nickel alloy.

2. The process of producing iron-nickel alloys having a desired ratio of nickel and iron from an ore containing iron and nickel, which comprises, reducing at least a portion of the iron and nickel in said ore to metallic form at a temperature between 500 and 700° C., treating the reduced ore with carbon monoxide to form iron and nickel carbonyls in vapor form, simultaneously decomposing said carbonyle to deposit an iron-nickel alloy and regulating the conditions of treatment in the various steps of said process in order to produce a desired ratio of nickel to iron.

3. The process of producing iron-nickel alloys having a desired ratio of nickel and iron from an ore containing iron and nickel, which comprises, reducing said ore at a temperature between 500 and 700° C. to reduce at least a portion of the iron and nickel in said ore to metallic form, treating the reduced ore with carbon monoxide to form iron and nickel carbonyls in vapor form, removing and decomposing said carbonyle simultaneously to deposit an iron-nickel alloy and adjusting the temperature during the formation of said carbonyls in order to control the ratio of nickel carbonyl to iron carbonyl so as to produce an alloy having a desired ratio of nickel to iron.

4. The process of producing iron-nickel alloys having a desired ratio of nickel and iron from an ore containing iron and nickel oxides, which comprises, reducing at least a portion of the iron and nickel oxides in said ore to metallic form at a temperature between 500 and 700° C., treating the reduced ore out of contact with the atmosphere with carbon monoxide at a temperature between 40 and 80° C. to form iron and nickel carbonyls in vapor form, removing said carbonyls from said ore and subjecting the same to a temperature above 200° C. to simultaneously decompose the same to deposit an iron-nickel alloy, and adjusting the temperature during the formation of said carbonyls to control the ratio of nickel carbonyls to iron carbonyl vapors so as to produce an alloy having a desired ratio of nickel to iron.

5. The process of producing iron-nickel alloys having a desired ratio of nickel and iron from an ore containing iron and nickel oxides, which comprises, reducing at least a portion of the iron and nickel oxides with a reducing gas at a temperature between 500 and 700° C. to form metallic iron and nickel, cooling the ore and treating the same with carbon monoxide at a temperature between 40 and 80° C. to form iron and nickel carbonyls in vapor form, separating said carbonyls from the remaining ore, and simultaneously decomposing said carbonyls by subjecting the same to temperatures above 200° C. to deposit an iron-nickel alloy, and controlling the temperature during reduction of said ore and the formation of said carbonyls in order to produce a desired ratio of nickel to iron in said alloy.

6. The process of producing iron-nickel alloys having a desired ratio of nickel and iron from an ore containing iron and nickel oxides, which comprises, treating said ores with a reducing gas at a temperature between 500 and 700° C. to reduce at least a portion of the iron and nickel oxides in said ore to metallic form, treating the reduced ore out of contact with the atmosphere with carbon monoxide at a temperature between 40 and 80° C. to form iron and nickel carbonyls in vapor form, removing said carbonyls from said ore and subjecting the same to a temperature sufficiently high to simultaneously decompose the same to deposit an iron-nickel alloy, and adjusting the temperature during the formation of said carbonyls to produce a predetermined ratio of nickel carbonyl to iron carbonyl so as to produce an alloy having a desired ratio of nickel to iron.

7. The process of producing an iron-nickel alloy having a desired ratio of nickel to iron from an ore containing iron and nickel oxides, which comprises, reducing at least a portion of the iron and nickel oxides in said ore to metallic form with a reducing gas at a temperature between 500 and 700° C. and below the fusion temperature of the constituents of said ore but sufficiently high to reduce a substantial amount of said iron oxide, treating the reduced ore out of contact with the atmosphere with carbon monoxide at a temperature between 40 and 80° C. to form iron and nickel carbonyls in vapor form, removing said carbonyls from said ore and subjecting the same to a temperature above 200° C. to simultaneously decompose the same to deposit an iron-nickel alloy, and adjusting the temperature during formation of said carbonyls to produce a predetermined ratio of nickel carbonyl to iron carbonyl so as to produce an alloy having a predetermined ratio of nickel to iron.

KENNETH M. SIMPSON.